United States Patent [19]

May

[11] Patent Number: 4,673,455
[45] Date of Patent: Jun. 16, 1987

[54] SELF-CENTERING SEALING FOR ELECTRODE STRUCTURE

[75] Inventor: Michael G. May, Bel Air, Switzerland

[73] Assignee: Air, Ltd., Arlington, Va.

[21] Appl. No.: 799,054

[22] Filed: Nov. 18, 1985

Related U.S. Application Data

[63] Continuation-in-part of Ser. No. 608,735, May 10, 1984, abandoned.

[51] Int. Cl.$^4$ .................. B32B 1/08; B32B 31/04; B32B 31/22
[52] U.S. Cl. .................. 156/294; 156/303.1; 156/305; 156/307.3; 445/7
[58] Field of Search ......... 445/7; 156/275.7, 293–294, 156/297, 303.1, 305, 307.3

[56] References Cited

U.S. PATENT DOCUMENTS

| | | | |
|---|---|---|---|
| 2,360,287 | 10/1944 | Smith | 445/7 |
| 2,393,497 | 1/1946 | Gregory | 445/7 |
| 2,894,315 | 7/1959 | Candelise | 445/7 |
| 3,537,160 | 11/1970 | Testerini | 445/7 |
| 4,181,549 | 1/1980 | McPhee | 156/305 |
| 4,414,483 | 11/1983 | Nishio | 445/7 |
| 4,482,415 | 11/1984 | Mort | 156/294 |

*Primary Examiner*—Donald E. Czaja
*Assistant Examiner*—Merrell C. Cashion, Jr.
*Attorney, Agent, or Firm*—Edwin E. Greigg

[57] ABSTRACT

An improved method for fabricating electrode structures, particularly flame-front sensors, spark plugs and the like, wherein the center electrode, the insulating housing therefor, and an outer housing are dimensioned such that a small clearance space is provided between each of the parts; a fluid glue is inserted in the clearance or spacing provided in a fixation zone at one end of the structure by capillary action, so that the device is self-centering and heat sealed and not more than 3 mm in diameter, thus facilitating quick and easy installation in engine cylinder heads and combustion chambers.

13 Claims, 2 Drawing Figures

SELF-CENTERING SEALING FOR ELECTRODE STRUCTURE

RELATED PATENT APPLICATION

This invention is a continuation-in-part of application Ser. No. 608,735, filed May 10, 1984, now abandoned.

BACKGROUND OF THE INVENTION

This invention relates to electrode structures for spark plugs, flame-front sensors, ionization sensors and the like, such as used in a generally automotive engineering context, and more particularly to a method and apparatus for fixing the central electrode of such devices within a surrounding insulating housing.

Conventional methods for sealing center electrodes within an insulating housing requires adequate spacing between the parts, centering procedures requiring additional tooling, and the infusion of special sealing powders within circumferentially extending gaps provided in the parts to be assembled. Moreover, the assembling and sealing steps for the various parts of the electrode structure, such as the center electrode, the insulator and the housing therefor must be timely separated to thus allow each step to be individually performed. As in most cases of spark plug manufacturing, a rolling and setting is also required in the course of the assembling process, as is well known in the art. Modern high efficiency combustion chambers in automobile engines now require that such electrode devices be used for sensing operating conditions and that such sensors or probes be accurately located, often in places where space is at a premium if not indeed severely limited. It is therefore necessary to reduce as much as possible the dimensioning of such electrode structures and probe devices in order to facilitate their installation, as well as their operation within confined areas.

SUMMARY OF THE INVENTION

It is a main purpose and object of the invention to simplify the process of constructing an electrode assembly and concomitantly to reduce the dimensioning of the electrode structures such that they can be easily installed in space limiting environments, such as cylinder heads and combustion chambers in high efficiency engines. Additionally, the heat transfer factor is considerably improved. Because of the simplified process of assembling an electrode structure according to the principles of the invention, the benefit of cost reduction in processing such electrodes is realized along with the reduction in the failure rate in mass producing such electrode structures.

According to the principles of the invention, a method and apparatus is provided in which the parts comprising a hot electrode structure used as a spark plug, sensing probe and the like, are dramatically reduced, and only a very thin clearance between the parts is provided, so that centering procedures used for centering the center electrode within an insulating housing are eliminated. The method and apparatus further provides for the use of a fluid glue to be used in a fixation zone between the center electrode and the insulating housing which may flow by capillary action to form a seal therebetween and which also prevents heat transfer between one end of the electrode exposed to combustion gases within a combustion chamber and the exterior cool end of the electrode.

The invention will be better understood as well as further objects and advantages thereof become more apparent from the ensuing detailed description taken in conjunction with the drawings.

DETAILED DESCRIPTION

Figure 1:
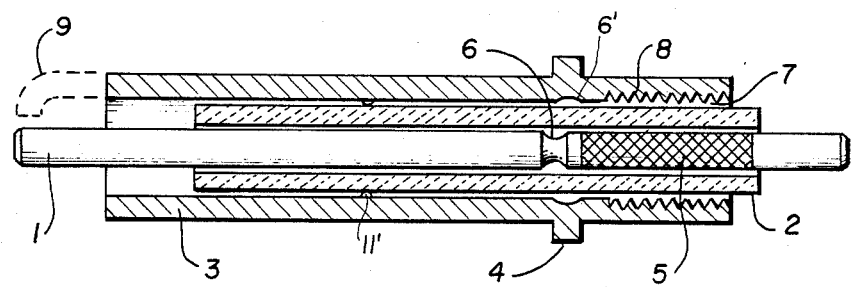
FIG. 1 is a partial cross-section and elevation view of the electrode device constructed according to the invention.

Referring now to FIG. 1, there is shown a sensor electrode including an electrode 1 fixed in an insulating housing 2 shown in turn surrounded by an electrically conductive housing 3 having a shoulder portion 4 circumferentially extending therearound which serves to fix the housing in the wall face of a combustion chamber or a cylinder head of an engine or wherever the sensor electrode is to be used. An electrical ground electrode 9 is shown in dotted lines extending from the housing 3. A thin annular space or gap exists between the electrode 1 and the insulating housing 2, and between the insulating housing and the housing 3. The electrode 1 is seen to have a portion that extends beyond the insulating housing on both ends thereof and has a knurled surface area 5 near one end portion thereof confined within the insulating housing and a circumferentially extending annular groove 6 is formed adjacent to one end of the knurled portion. Similarly, annular grooves 6' as shown in housing 3 may be used.

The very thin space or gap between the insulating housing and the knurled portion on the electrode can be termed as a fixation zone in which a fluid glue 7 can be introduced, by capillary action for fixing the relative parts with respect to each other, as well as improving the heat transfer. A glue such as "LOCTITE RC/620" or similarly performing glues has been found to be suitable, even at room temperatures. Such glues can withstand temperatures up to 220° C., for example. The annular groove 6 serves to limit the flow of glue and thus acts as a barrier for the glue as well as a barrier for heat flow.

Similarly, a thin space between the housing 3 and the insulating portion 2 also receives a fluid glue, and the threaded portion 8 in the housing 3 serves to increase the contact adhesion surface between the insulating housing 2 and the housing 3. Because of the very small dimensional clearance between the electrode 1 and the insulating housing and between the insulating housing 2 and the housing 3, in order of 0.05 mm to 0.15 mm, no centering or coaxial alignment is needed for the fabrication of the electrode structure as shown in FIG. 1. Guide shoulders as indicated by 11' in the housing 3, similarly in purposes as explained for FIG. 2 may be used.

Figure 2:
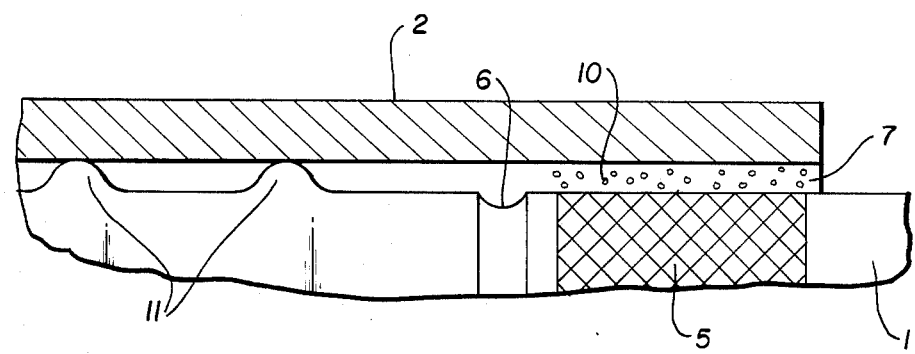
FIG. 2 is an enlarged schematic view of a portion of the embodiment as shown in FIG. 1.

FIG. 2 shows an embodiment of the invention in which guide shoulders 11 are shown on the center electrode 1 for guiding same within the insulating housing 2, if such centering is desirable. Also, the glue is shown to have filler particles 10 included therein.

By means of the invention as above described, electrode structures, such as flame-front sensors and the like, can be fabricated having only 3 mm, external diameter, which thus readily allows "through the deck" installation in existing cylinder heads and combustion chambers of internal combustion engines.

What is claimed and desired to be secured by Letters Patent of the United States is:

1. A method for fabricating a gas-tight, electrically insulating fixation zone on a cool end of an elongated electrode structure within an insulating housing and fixing said insulating housing in an outer housing means, comprising the steps of forming a contact surface area on one end of said elongated electrode structure in said electrically insulating fixation zone, forming an annular heat and glue barrier groove within said elongated electrode structure inwardly of said contact surface area on an end thereof, positioning said elongated electrode structure within said insulating housing with a first annular spacing therebetween extending along the length thereof such that said contact surface and said annular barrier groove are confined within one end of said insulating housing, positioning said insulating housing within said outer housing means with a second annular spacing therebetween extending along the length thereof, applying a glue which will withstand a cured temperature of at least 220° C. into said first annular spacing between said contact surface area of said elongated electrode structure and said insulating housing and in said second annular spacing between said insulating housing and said outer housing means in said electrically insulating fixation zone radially opposite said contact surface area of said elongated electrode structure whereby said glue flows by capillary action and said flow is limited by said barrier, and permitting the glue admitted into said first and second annular spacing to cure thereby sealing said electrode within said insulating housing and sealing said insulating housing within said housing means along said electrically insulating fixation zone.

2. A method according to claim 1, wherein said first and second annular spacings define a gap in the range of from 0.05 to 0.15 mm.

3. A method according to claim 1, wherein the overall diameter of said electrode structure, said insulating housing and said outer housing means is no more than 3 mm.

4. A method according to claim 2, wherein the overall diameter of said electrode structure, said insulating housing and said outer housing means is no more than 3 mm.

5. A method according to claim 1, wherein said glue contains a filler material.

6. A method according to claim 2, wherein said glue contains a filler material.

7. A method according to claim 3, wherein said glue contains a filler material.

8. A method according to claim 4, wherein said glue contains a filler material.

9. A method according to claim 1, wherein said outer housing means is provided with an increased contact surface area in said fixation zone formed by screw threads on an outer surface of said insulating housing and screw threads on an inner surface of said outer housing means.

10. A method according to claim 1, which comprises forming said electrode structure with at least one centering guide means for centering said electrode structure within said insulating housing.

11. A method according to claim 1, wherein said glue is liquid at ambient air temperature.

12. A method for fabricating a gas-tight, electrically insulating fixation zone on a cool end of an elongated electrode structure within an insulating housing and fixing said insulating housing in an outer housing means, comprising the steps of forming a first predetermined fixation zone having a contact surface on an inner surface of said outer housing means, forming a second predetermined fixation zone and a glue barrier on an exterior surface of said electrode structure, applying a glue substance to said contact surfaces of said first and said predetermined fixation zones, assembling said electrode structure within said insulating housing, assembling said insulating housing within said housing means with said first and second predetermined fixation zone radially opposite each other, restricting said glue substance to said fixation zone by means of said glue barrier, and permitting said glue substance to set.

13. A method as set forth in claim 12 in which the glue substance is applied subsequent to assembly of the electrode structure within said insulating housing and assembly of said insulating housing within said housing means.

* * * * *